(12) United States Patent
Kalnas

(10) Patent No.: US 7,980,019 B2
(45) Date of Patent: Jul. 19, 2011

(54) FISHING LURE

(76) Inventor: Steven P. Kalnas, St. Cloud, FL (US)

( * ) Notice: Subject to any disclaimer, the term of this patent is extended or adjusted under 35 U.S.C. 154(b) by 42 days.

(21) Appl. No.: 12/318,496

(22) Filed: Dec. 30, 2008

(65) Prior Publication Data

US 2010/0162612 A1 Jul. 1, 2010

(51) Int. Cl.
*A01K 85/00* (2006.01)
*A01K 85/02* (2006.01)

(52) U.S. Cl. ...... 43/42.15; 43/42.24; 43/42.1; 43/42.41; 43/42.37

(58) Field of Classification Search ............... 43/42.24, 43/42.15, 42.1, 42.41, 42.36, 42.37, 42.38
See application file for complete search history.

(56) References Cited

U.S. PATENT DOCUMENTS

| | | | | |
|---|---|---|---|---|
| 596,385 A * | 12/1897 | Simon | | 43/42.24 |
| 821,732 A * | 5/1906 | Olsby | | 43/42.37 |
| 857,593 A * | 6/1907 | Brown | | 43/42.15 |
| 862,206 A * | 8/1907 | Sillman | | 43/42.15 |
| 879,869 A * | 2/1908 | Hansen | | 43/42.36 |
| 1,429,571 A * | 9/1922 | Davis | | 446/368 |
| 1,545,683 A * | 7/1925 | Nowak | | 43/42.15 |
| 1,557,644 A * | 10/1925 | Andersen | | 43/42.15 |
| 1,593,604 A * | 7/1926 | Schreiner et al. | | 43/42.37 |
| 1,607,107 A * | 11/1926 | Weller | | 43/42.15 |
| 2,069,972 A * | 2/1937 | Schroeder | | 43/42.15 |
| 2,341,999 A * | 2/1944 | Lennington | | 264/226 |
| 2,501,449 A * | 3/1950 | Lutz et al. | | 43/42.3 |
| 2,663,964 A * | 12/1953 | Martin | | 43/42.15 |
| 2,690,026 A * | 9/1954 | King | | 43/42.36 |
| 2,724,205 A * | 11/1955 | Howard | | 43/42.02 |
| 2,770,063 A * | 11/1956 | Martin | | 43/42.02 |
| 2,851,814 A * | 9/1958 | Lutz | | 43/42.15 |
| 2,910,799 A * | 11/1959 | Wentworth | | 43/42.15 |
| 2,971,285 A * | 2/1961 | Murawski | | 43/42.15 |
| 3,133,373 A * | 5/1964 | Jeffers | | 43/42.15 |

(Continued)

FOREIGN PATENT DOCUMENTS

EP 6964 A1 * 1/1980

(Continued)

OTHER PUBLICATIONS

Website, http://www.cabelas.com/cabelas/en/templates/links/link.jsp;jsessionid=RULBXXVLTKFN1LAQBBJSCOFMCAEFIIWE?id=0049227122377a&type=product&cmCat=Froogle&cm_ven=data_feed&cm_cat=froogle&cm_pla=0290201&cm_ite=0049227122377a&requestid=31773, "Mann's Hardnose Snake" lure, two pages printed from the internet, Aug. 27, 2008.

*Primary Examiner* — Darren W Ark
(74) *Attorney, Agent, or Firm* — Richard C. Litman

(57) ABSTRACT

The fishing lure is formed in a variety of configurations mimicking various prey animals to which game fish might be attracted. Each lure is formed of relatively soft plastic or rubber for flexibility, although the head or forward end of the lure may optionally be formed of harder material. The lure includes a pair of laterally opposed notches or grooves between the head and body, and a series of longitudinally staggered notches or grooves across the upper and lower body or tail portion. These notches or grooves provide even greater flexibility for the lure, allowing the lure to undulate due to hydrodynamic force when drawn through the water. The hook is installed in the forwardmost portion of the lure with the tip oriented above and/or forwardly of the remainder of the lure, to avoid reduction of body flexibility due to being penetrated by the relatively stiff shank of the hook.

6 Claims, 6 Drawing Sheets

U.S. PATENT DOCUMENTS

| | | | | |
|---|---|---|---|---|
| 3,158,952 A * | 12/1964 | Creme | | 43/42.24 |
| 3,349,513 A * | 10/1967 | Jeff | | 43/42.24 |
| 3,490,165 A * | 1/1970 | Thomassin | | 43/42.24 |
| 3,505,755 A * | 4/1970 | Pearce | | 43/42.24 |
| 3,537,207 A * | 11/1970 | McClellan et al. | | 43/42.15 |
| 3,543,430 A * | 12/1970 | Brokaw | | 43/42.24 |
| 3,685,197 A * | 8/1972 | McClellan | | 43/42.24 |
| 3,735,518 A * | 5/1973 | Kleine et al. | | 43/42.15 |
| 3,992,800 A * | 11/1976 | Neil | | 43/42.24 |
| 4,214,397 A * | 7/1980 | Kent | | 43/42.28 |
| 4,317,305 A * | 3/1982 | Firmin | | 43/42.24 |
| 4,516,352 A * | 5/1985 | Firmin | | 43/42.37 |
| 4,709,501 A * | 12/1987 | Garst | | 43/42.24 |
| 4,744,168 A * | 5/1988 | McClellan | | 43/42.24 |
| 4,890,412 A * | 1/1990 | Tsao et al. | | 43/42.24 |
| 4,914,850 A * | 4/1990 | Rice | | 43/42.24 |
| 4,976,060 A * | 12/1990 | Nienhuis | | 43/42.41 |
| 4,998,372 A * | 3/1991 | Reed | | 43/42.24 |
| 5,182,875 A * | 2/1993 | Righetti | | 43/42.24 |
| 5,465,523 A * | 11/1995 | Garst | | 43/42.24 |
| 5,678,350 A * | 10/1997 | Moore | | 43/42.15 |
| 5,787,634 A * | 8/1998 | Way | | 43/42.24 |
| 5,894,692 A * | 4/1999 | Firmin | | 43/42.24 |
| 5,934,008 A * | 8/1999 | Rice | | 43/42.24 |
| D414,839 S | 10/1999 | Laney | | |
| 6,061,949 A * | 5/2000 | Fairchild | | 43/42.24 |
| 6,073,383 A * | 6/2000 | Line | | 43/42.24 |
| 6,094,855 A * | 8/2000 | Stump | | 43/42.24 |
| 6,115,956 A * | 9/2000 | Firmin | | 43/42.24 |
| 6,138,399 A * | 10/2000 | Wilson | | 43/42.24 |
| 6,145,239 A * | 11/2000 | Hirahara et al. | | 43/42.34 |
| 6,170,190 B1 * | 1/2001 | Wilson | | 43/42.24 |
| 6,212,818 B1 * | 4/2001 | Huddleston | | 43/42.37 |
| 6,226,918 B1 * | 5/2001 | Rigney | | 43/42.24 |
| 6,266,915 B1 * | 7/2001 | Stump | | 43/42.24 |
| 6,662,487 B2 * | 12/2003 | Perrone, Jr. | | 43/42.24 |
| 6,665,977 B2 * | 12/2003 | Hammond | | 43/42.36 |
| 6,775,944 B1 * | 8/2004 | Jones, Jr. | | 43/42.24 |
| 7,266,922 B2 * | 9/2007 | Oelerich et al. | | 43/42.24 |
| 7,356,963 B2 * | 4/2008 | Scott | | 43/42.15 |
| 7,559,172 B2 * | 7/2009 | Hogan | | 43/42.24 |
| 7,788,842 B2 * | 9/2010 | Tsai | | 43/42.15 |
| 2005/0217166 A1 * | 10/2005 | MacDonald | | 43/42.36 |
| 2006/0037230 A2 | 2/2006 | Oelerich, Jr. et al. | | |
| 2006/0162232 A1 * | 7/2006 | Allen | | 43/42.36 |
| 2008/0078114 A1 * | 4/2008 | Pack | | 43/42.15 |
| 2008/0115403 A1 * | 5/2008 | Shelton et al. | | 43/42.24 |
| 2008/0202017 A1 * | 8/2008 | Gregory | | 43/42.39 |
| 2009/0223108 A1 * | 9/2009 | Hastbacka et al. | | 43/42.24 |

FOREIGN PATENT DOCUMENTS

| | | | |
|---|---|---|---|
| FR | 2672773 | | 8/1992 |
| JP | 11018626 A | * | 1/1999 |
| JP | 2004329059 A | * | 11/2004 |
| JP | 2005229824 A | * | 9/2005 |
| JP | 2006311825 A | * | 11/2006 |

* cited by examiner

FISHING LURE

BACKGROUND OF THE INVENTION

1. Field of the Invention

The present invention relates generally to fishing tackle, and articularly to a fishing lure formed of a soft and flexible plastic material having a series of laterally narrowed portions, notches, or grooves along its length for added flexibility and movement.

2. Description of the Related Art

Bait and lures have been used for centuries to attract game animals and fish. As the sport of fishing has become more sophisticated, an ever-increasing variety of lures has been developed for use in the sport and for commercial use as well.

The development of relatively new materials has also been of benefit in the manufacture of lures, particularly fishing lures. It is well known that fish are generally attracted to a number of smaller animals, e.g., worms and insects, and frogs, lizards, eels and small snakes, etc. for somewhat larger game fish. Many of these animal varieties exhibit great flexibility, e.g., worms, eels, and snakes, and predator fish are thought to be instinctively predisposed to be attracted to objects exhibiting such movement.

Accordingly, many lure manufacturers have attempted to roduce lures mimicking such bodily movements. These efforts have generally met with limited success, primarily due to the relatively hard materials available in the past. More recently, softer plastic materials (e.g., lastisol, a soft silicone rubber resin material) have been developed for various purposes, and some of these have been adapted for use in the manufacture of fishing lures. Such softer materials provide the greater flexibility desired to mimic the movements of live prey animals, but efforts in this direction have not been entirely successful.

Another problem with fishing lures developed in the past has been the placement and/or orientation of the hook. Generally, the hook(s) is/are placed somewhat rearwardly on the body of the lure, with it being assumed that the fish will strike the lure from behind. As the leader must extend from the forward end of the lure, this either leaves a relatively weakened area between the end of the leader and the hook in lures formed of softer materials, or requires the leader or a separate wire or the like to be run through the body of the lure, which changes the flexibility of the lure.

An example of a lure from the related art is found in French Patent No. 2,672,773, published on Aug. 21, 1992. According to the drawings and English abstract, this reference describes a fishing lure with an elongated and angled shank. The hook extends from its eye at the nose of the lure, passing through the body to exit near the tail of the lure. The abstract indicates that only the tail of the lure, i.e., that portion of the lure rearward of the hook, is free to move due to hydrodynamic force as the lure is pulled through the water.

None of the above inventions and patents, taken either singly or in combination, is seen to describe the instant invention as claimed. Thus, a fishing lure solving the aforementioned problems is desired.

SUMMARY OF THE INVENTION

The fishing lure may be formed in a number of different embodiments, each at least generally mimicking the shape or configuration of a prey animal to which a game fish might be attracted. The various lure embodiments are each formed with a pair of laterally opposed notches or grooves between the forward end or head of the lure and the lure body, and a series of longitudinally staggered upper and lower notches or grooves disposed along the body, tail, or portions thereof. The laterally opposed notches behind the head result in a thinner cross section of material connecting the head to the body, and this, along with the flexibility of the material from which the lure is formed, allows the head and body of the lure to move or flex relative to one another to provide realistic movement. The laterally oriented notches or grooves on the upper and lower sides of the body and/or tail also increase the flexibility of the lure, allowing the body and/or tail to undulate through the water in the vertical plane as the lure is trolled or reeled in.

Each of the embodiments of the fishing lure also has the hook installed forwardly in the lure, with the curve of the hook positioned forwardly of the eye and the tip of the hook oriented above or forwardly of the shank. The angler may install the hook through the head of the lure where the head is formed of the same soft material as the body, or the shank of the hook may be encapsulated in the head at the time of manufacture, where harder compounds are used for forming the head of the lure. The lure may be manufactured with the head generally aligned with the body, or with the head angled downwardly relative to the body. In any event, the orientation of the hook and position of the hook eye relative to the head and body of the lure results in the head being forced down at an angle to the body due to hydrodynamic drag as the lure is drawn through the water. In this manner, the tip of the hook is positioned forwardly of the remainder of the hook and lure structure, with the possible exception of the hook eye. The tip of the hook may contact or slightly penetrate the material of the head of the lure, or the hook may include a weed guard, to reduce or prevent the hook from catching on weeds or other obstructions.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The fishing lure is formed of a soft, resilient plastic material (e.g., plastisol or other suitable material). The density of the plastisol or other material may be adjusted as desired during manufacture to provide greater or lesser specific gravity than water for the desired effect. A lure having a specific gravity or density greater than water will sink, while a lure with a density less than that of water will float. These different densities may be selected by the angler, as desired, depending upon his or her sense of the likelihood of the subject fish taking a lure on the surface or at some depth below the surface.

Each of the embodiments of the lure includes mutually opposed, laterally spaced vertical notches or grooves between the head portion and neck portion, and a plurality of longitudinally staggered, laterally disposed grooves or notches along the upper and lower surfaces of the body and/or tail portion(s). The hook extends forwardly from the head portion of the lure in each of the embodiments.

Figure 1:
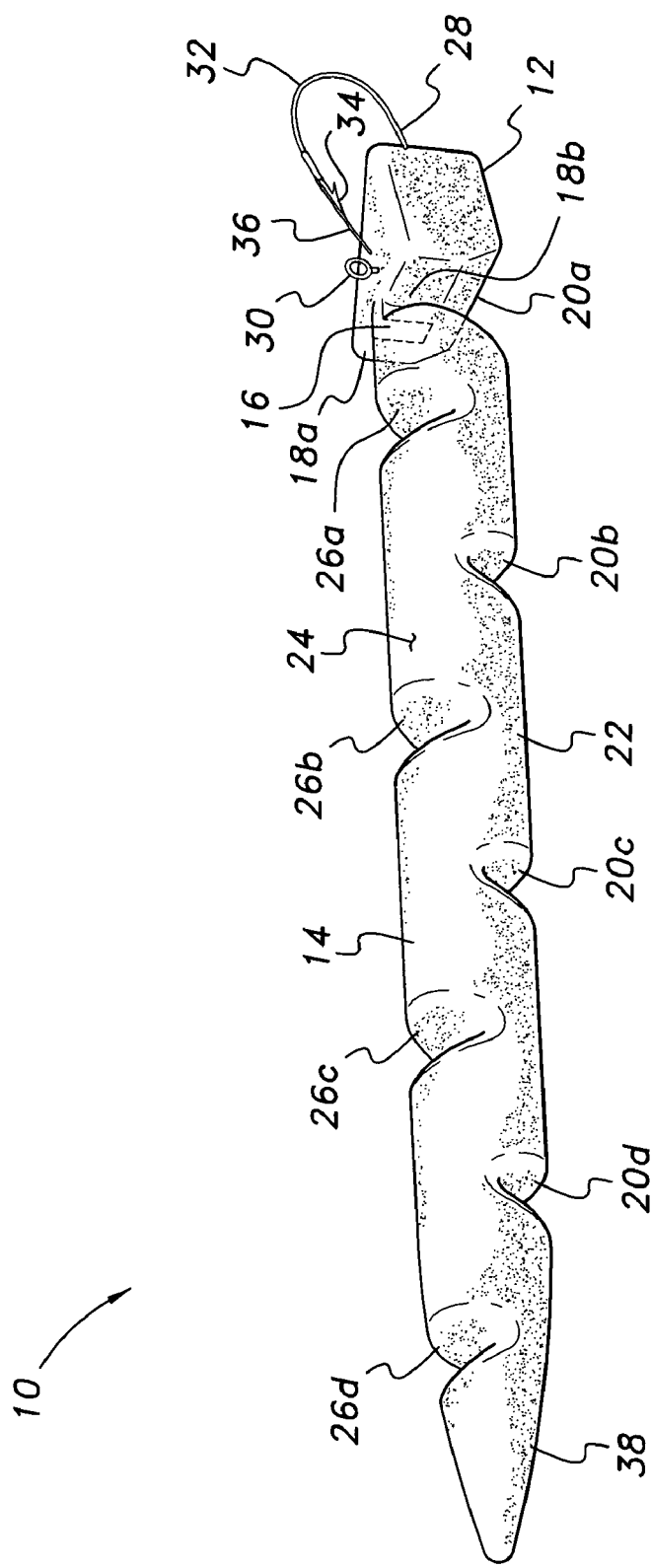
FIG. 1 is a right side perspective view of a first embodiment of a fishing lure according to the present invention, showing various features thereof.
Figure 2:
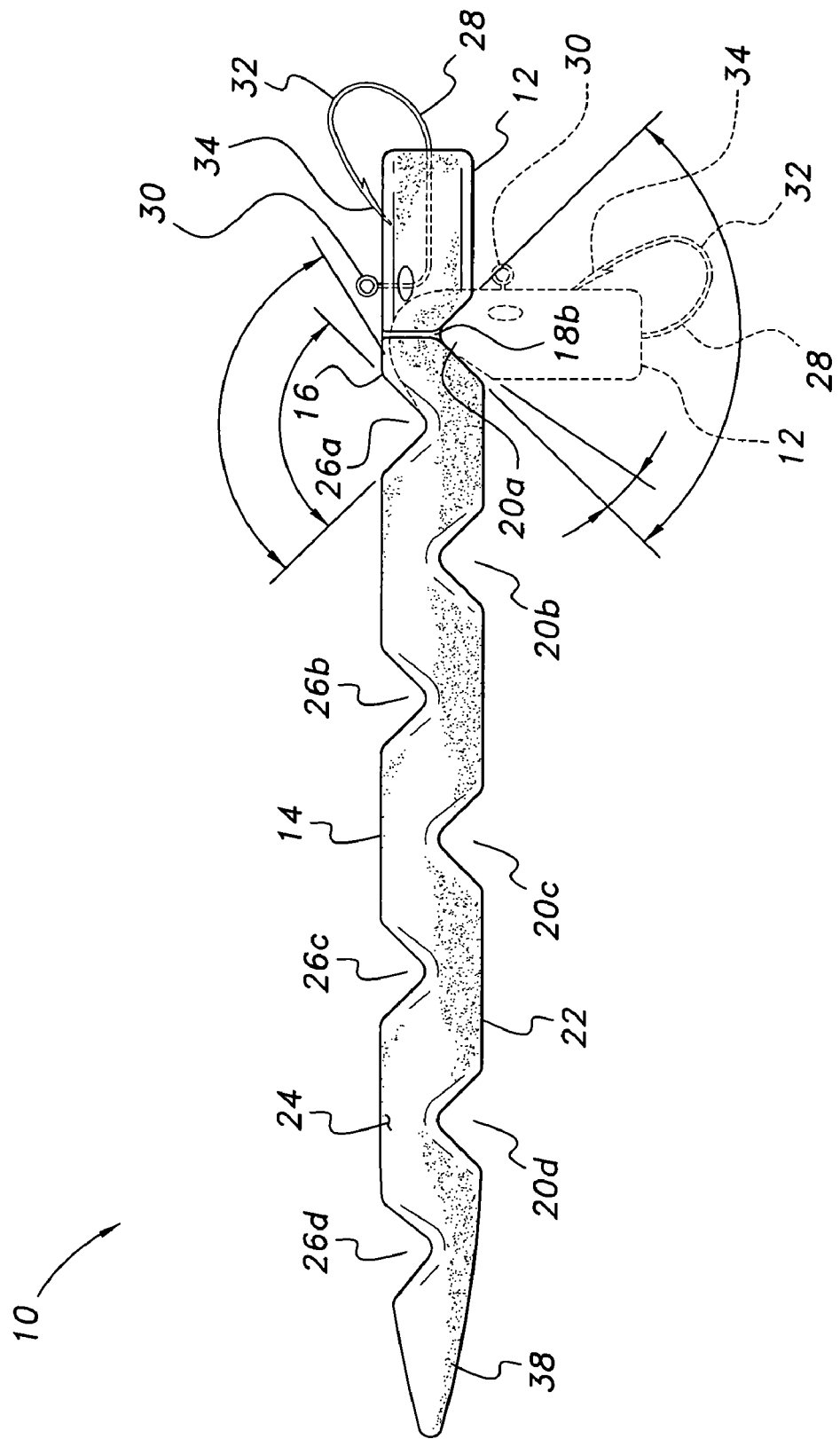
FIG. 2 is a right side elevation view of the lure of FIG. 1, illustrating the motion of the head of the lure.
Figure 3:
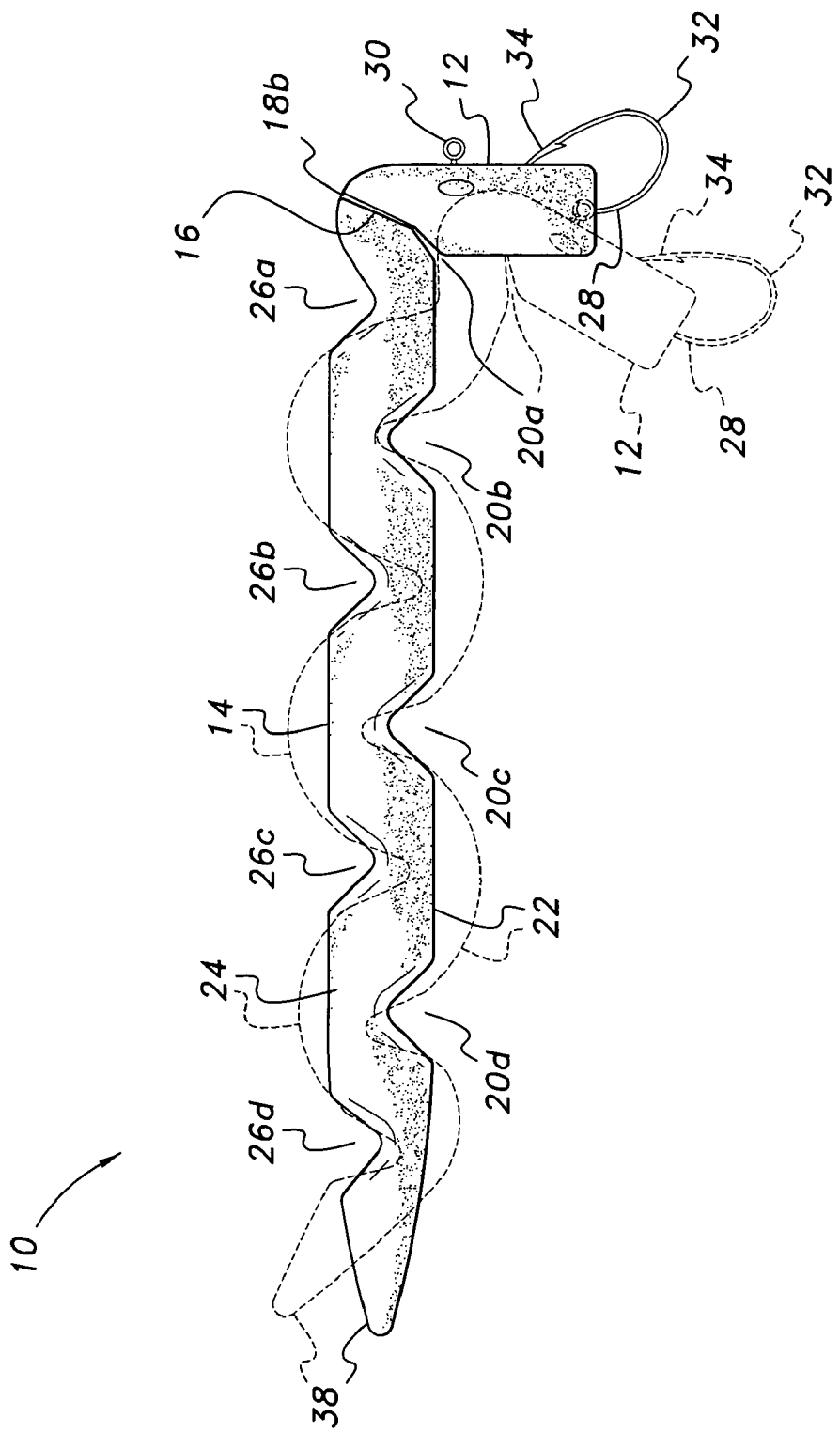
FIG. 3 is a right side elevation view of the lure of FIGS. 1 and 2, illustrating the motion of the body of the lure.

FIGS. 1 through 3 of the drawings illustrate a first embodiment 10 of the fishing lure. The lure 10 includes a head portion 12, a body ortion 14, and a relatively narrow neck portion 16 connecting the head and body portions 12 and 14. The relatively wider head and body portions 12 and 14 define a pair of laterally opposed, vertically oriented first and second grooves, respectively 18a and 18b, therebetween, with the resulting narrow neck portion 16 providing relatively great lateral and torsional flexibility between the head and body at this point. Preferably, another laterally disposed notch or groove 20a extends across the width of the juncture of the head, body, and neck and generally coplanar with the first and second grooves 18a and 18b, with this lower groove 20a resulting in a reduction of the depth of the neck portion 16 (as can be seen in FIGS. 2 and 3) for even greater flexibility at the juncture of the head and body portions 12 and 14.

The body portion 14 includes a lower surface or side 22 and an opposite upper surface or side 24. Each side includes a series of laterally oriented body flexure notches or grooves thereacross, i.e., the lower side 22 includes lower transverse grooves 20a, 20b, etc., while the opposite upper side 24 includes upper transverse grooves 26a, 26b, etc. The first or forwardmost lower transverse groove 20a also serves to reduce the vertical depth of the neck portion 18, as described above.

The corresponding upper and lower lateral or transverse grooves, notches or indentations e.g., the second lower groove 20b and the second upper groove 26b, are not directly above and below one another, but are staggered or offset longitudinally along the length of the body 14. Thus, none of the upper grooves are located directly above or opposite to a lower groove. This provides some additional strength to the body 14, and allows the grooves to extend somewhat more than halfway through the thickness of the body 14, if so desired. The body portion 14 may thus flex more readily about any of the various grooves or notches, but extreme flexibility concentrated at a single point, as in the case of the vertically disposed first and second grooves 18a, 18b, is not required at any one point along the length of the body portion 14.

The location of the upper and lower notches 20a, etc. and 26a, etc. across the upper and lower sides or surfaces of the body 14 allows the body to undulate in the vertical plane when the lure 10 is drawn through the water, generally as shown in FIG. 3 of the drawings. This action is a result of varying hydrodynamic pressure on the very flexible and unstable body ortion 14. The action of the body 14 through the water is somewhat analogous to the fluttering of a non-rigid flag in a breeze, but rather than being aerodynamic flutter, as in the case of a flag, the lure 10 is subject to hydrodynamic flutter when moved through the water, causing it to undulate in the vertical plane due to the positioning of the upper and lower grooves.

The head portion 12 of the lure 10 includes a fishhook installed therein, as most clearly shown in FIG. 2 of the drawings. The hook has a shank 28 embedded through or in the head 12 so as to be parallel with a longitudinal axis of the head 12, with an eye 30 extending therefrom and the curved bight 32 and tip 34 of the hook extending opposite the eye 30. The eye 30 and bight 32 are disposed externally to the head 12, with the positioning of the eye 30 facilitated due to the preferably bent or offset shank 28. The tip 34 of the hook may be spaced apart from the material of the head 12 of the lure, or may contact the soft material of the head to preclude the entrance of weeds and other foreign matter into the bight 32 of the hook until a fish strikes the lure and compresses the soft lure material, i.e., a "weedless" hook, as shown in FIGS. 2 and 3 of the drawings. Alternatively, a weed guard 36 may be provided, as shown in FIG. 1, to close the bight 32 of the hook until a fish strikes the lure.

The hook is preferably installed in the head 12 with the eye 30 ositioned slightly forward and above the vertical first and second neck grooves 18a and 18b. Thus, when the lure 10 is drawn through the water, as in trolling or reeling the lure in after a cast, the hydrodynamic drag restrains the body portion 14, with the head 12 being drawn somewhat away from the body. As the eye 30 is generally opposite the forwardmost lower groove or notch 20a, the pull of the fishing line or leader draws the higher mounted eye 30 forward, thereby causing the head 12 to fold downwardly, generally as shown in broken lines in FIG. 2 of the drawings.

The fishing lure may be formed or manufactured to have any of a number of different embodiments that mimic the appearance and/or dynamic action of a number of different animals to which fish might be attracted. The lure 10 of FIGS. 1 through 3 has a relatively thin, elongate body portion 14 with a generally triangular head 12 extending forwardly therefrom, with the body portion tapering to a tail 38. The triangular head 12 is intended to represent the general shape of the heads of certain lizards as well as members of the pit viper family of snakes, to which certain types of larger and/or more aggressive fish have been known to be attracted.

Figure 4:
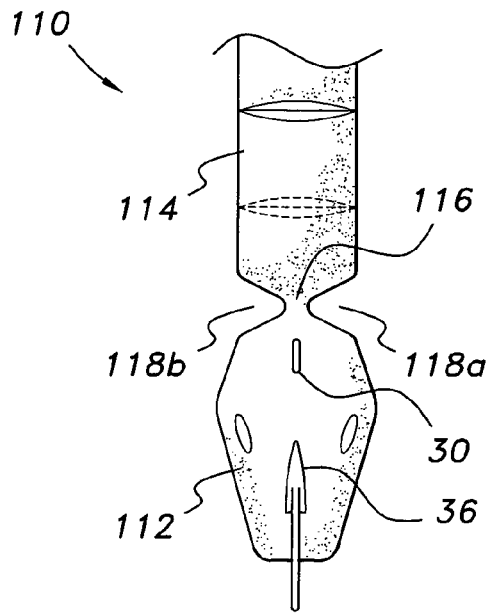
FIG. 4 is a top plan view of the forward end of a second embodiment of a fishing lure according to the present invention, illustrating its head and laterally notched neck.

FIG. 4 illustrates a top plan view of the forward portion of a lure 110 having a generally trapezoidal head 112 extending from the body 114. It will be noted that the two laterally separated grooves or notches 118a, 118b to each side of the head-to-body joint or neck 116 have an inwardly tapered or triangular shape with a rounded interior apex. The hook is installed much like the hook of the lure 10 of FIGS. 1 through 3, i.e., with the tip 36 extending over the head 112 and forwardly of the eye 30.

Figure 5:
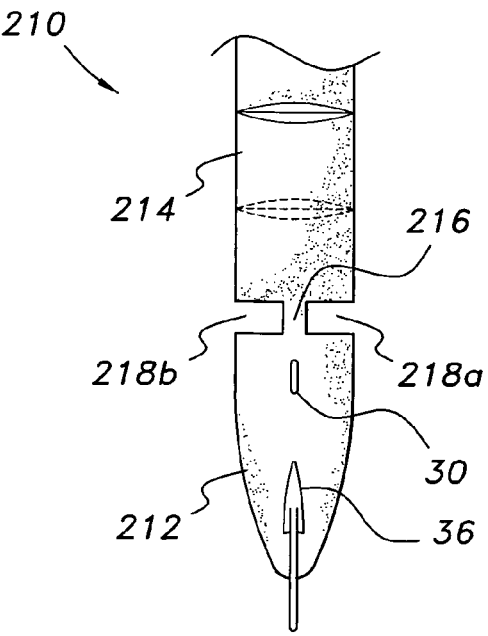
FIG. 5 is a top plan view of the forward end of a third embodiment of a fishing lure according to the present invention, illustrating its head and laterally notched neck.

FIG. 5 provides a top plan view of the forward portion of another fishing lure 210, in which the head 212 has a tapered configuration with a diameter or width about the same as that of the body portion 214. Certain snakes, eels, worms, etc. may have head shapes that are essentially the same width or thickness as the body. The laterally spaced grooves or notches at the neck area 216 are substantially rectangular in shape, with squared bottom or inner apices.

Figure 6:
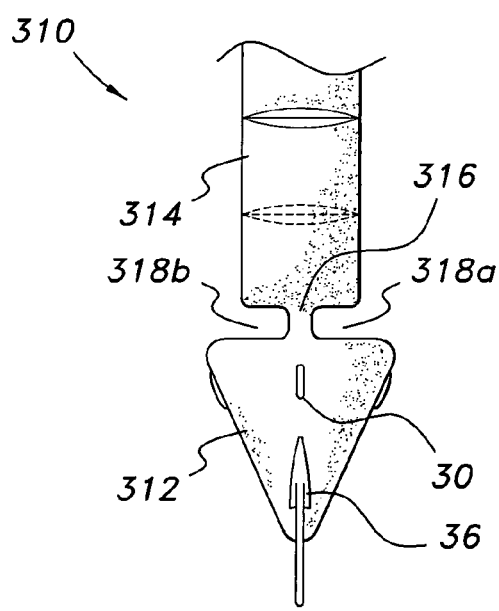
FIG. 6 is a top plan view of the forward end of a fourth embodiment of a fishing lure according to the present invention, illustrating its head and laterally notched neck.
Figure 7:
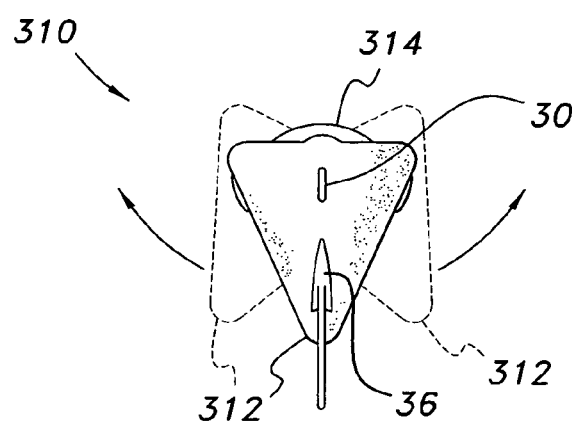
FIG. 7 is a front elevation view of the fishing lure of FIG. 6, showing the axial motion of the lowered head as the lure is advanced through the water.

The lure 310 of FIGS. 6 and 7 has a generally triangular head 312 shape that is essentially the same as the lure 10 of FIGS. 1 through 3. The top plan view of the forward portion of the lure 310 in FIG. 6, however, shows a slightly different lateral notch configuration, with the two grooves 318a and 318b having rounded bottoms or apices. The use of relatively rounded inner corners or apices for the various grooves or notches, e.g., 318a and 318b, as well as for the lower and upper body grooves, avoids "stress risers" that might concentrate stresses at otherwise sharp crevices and the like, thereby rolonging the life of the lure. The avoidance of stress risers is more of a concern with rigid materials, e.g., metals, but it can be a factor in softer materials as well.

FIG. 7 is a forward elevation view of the lure head of FIG. 6 as it would be oriented while being drawn through the water. The head 312 is lowered due to the tensile pull of the leader (not shown) on the eye 30 of the hook, much as the head 12 is shown in FIG. 3 of the drawings and representing the same conditions. While the pull of the leader on the eye 30 of the hook will tend to prevent the head 312 from swaying laterally, the relatively narrow thickness of the neck portion 316 provides excellent flexibility at that point along the lure and allows the head 312 to move axially through a limited arc, generally as shown by the broken line positions of the head 312 in FIG. 7. Some limited motion in other axes or directions may be achievable as well, but the forward pull of the fishing line or leader on the eye 30 of the hook will tend to limit head motion in the lateral or vertical lanes.

The use of cast or molded soft plastics for the head and body ortions of the lure in its various embodiments permits various portions of the lure to be formed of somewhat different materials, or densities and hardnesses of materials, from one another. For example, the head portion may be formed of a harder and/or more dense plastic than the relatively flexible body portion, with the head and body being fused together at the neck portion when the plastic is still in a fluid state during the molding or casting process. The use of a relatively hard or firm plastic material for the head is not critical, as the head per se does not require flexibility, as do the neck and body portions of the lure. The use of a harder or more firm material also allows the hook to be molded or encapsulated in place within the head portion at the time of manufacture of the lure, thereby freeing the angler from the requirement to install the hook through the head portion before using the lure.

Figure 8:
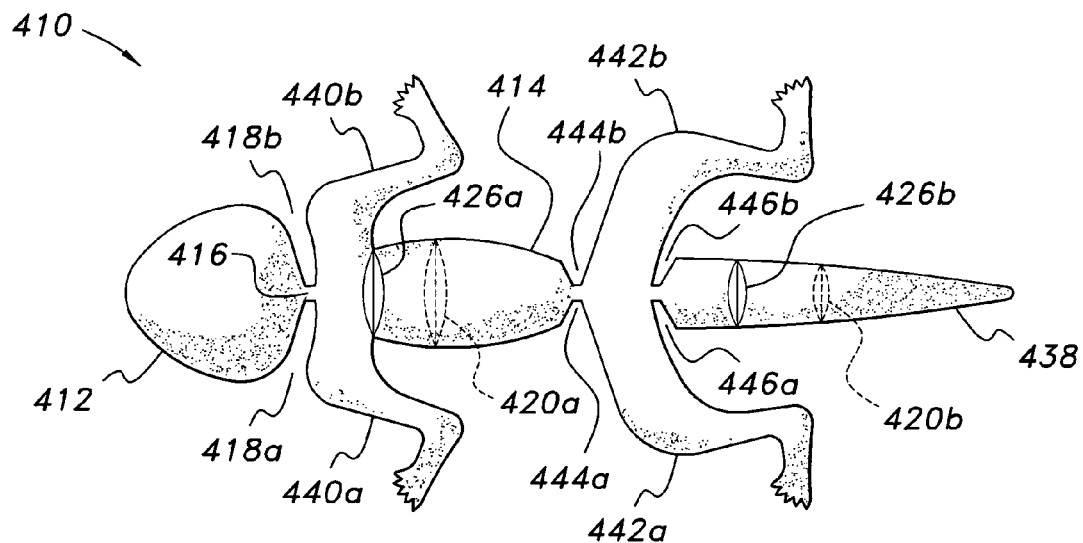
FIG. 8 is a top plan view of a fifth embodiment of a fishing lure according to the present invention, the lure having a lizard-like configuration.

FIG. 8 is a top plan view of still another embodiment of the fishing lure 410, having a lizard-like configuration. The lure 410 includes a head portion 412 (hook not shown, but essentially as shown in other embodiments), body portion 414, and a relatively narrow neck portion 416 joining the head and body portions 412 and 414. The relatively wider body and head portions 412 and 414 and narrower neck portion 416 define laterally opposed first and second grooves or notches, respectively 418a and 418b, as in the cases of the other embodiments described herein. The body ortion 414 includes laterally opposed forelegs 440a and 440b and laterally opposed hind legs 442a, 442b extending therefrom. In addition, the body ortion 414 may include rearwardly disposed laterally separated notches or grooves 444a, 444b in front of the rear legs 442a, 442b, and/or additional laterally separated notches or grooves 446a, 446b behind the rear legs and in front of the tail 438, if so desired, to provide greater lateral flexibility for the lure 410. The body portion 414 and tail 438 preferably include a series of lateral lower grooves 420a, 420b, etc., and opposite upper grooves 426a, 426b, etc., as in the cases of other embodiments.

Thus the lure 410 may simulate a swimming lizard, with the flexibility provided by the soft plastic material and the various grooves serving to provide a most lifelike action for the lure when it is drawn through the water. It should be noted that the provision of additional or supplemental lateral grooves or notches, or the relocation of such a pair of notches to a different area of the body or tail, may be provided on other embodiments as well, if so desired.

Figure 9:
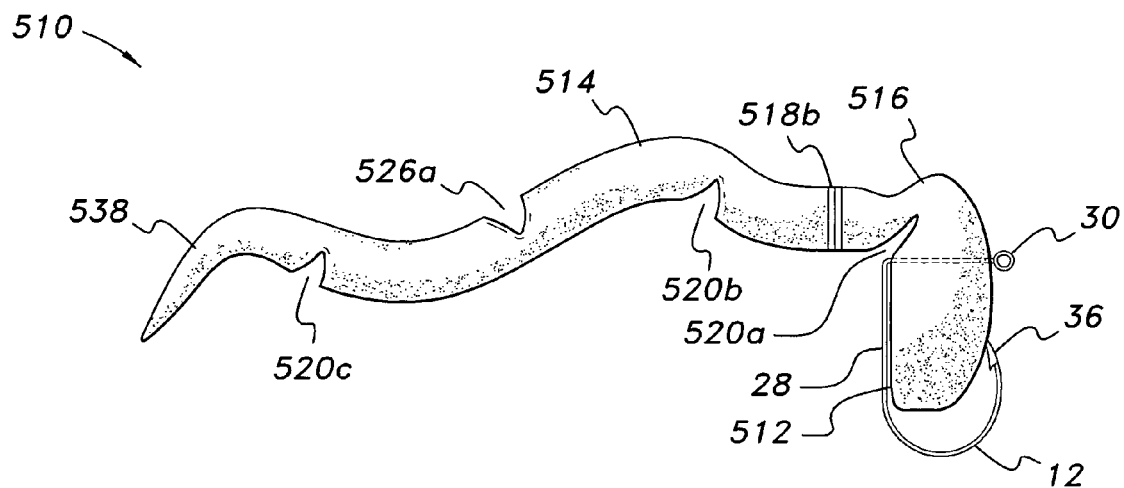
FIG. 9 is a side elevation view of a sixth embodiment of a fishing lure according to the present invention, the lure having a sinusoidal body configuration.

The lure 510 of FIG. 9 demonstrates yet another embodiment, with the lure 510 having a somewhat sinusoidal body portion 514. The head 512 is formed to have a somewhat lowered or downward position at the time of manufacture; this may be incorporated with any of the other lures as desired. The first or forwardmost lower body groove 520a defines a relatively narrow (in the vertical plane) neck portion 516, with the laterally opposed grooves (the right groove 518b being shown in FIG. 9) being displaced somewhat behind the first lower body groove 520a, rather than being coplanar with that groove 520a. This longitudinal displacement of the forwardmost lower body groove and the two laterally opposed grooves may be formed with any of the other embodiments as desired. The body 514 and tail 538 include a series of longitudinally staggered or offset lower and upper body grooves, e.g., 520a, 520b, 520c, and 526a for the upper body groove. These grooves provide greater flexibility in the vertical plane for the body 514 and tail 538. Moreover, the sinusoidal shape of the body 514 as cast or molded tends to simulate a crippled or malformed prey animal, with redators generally pursuing and striking such prey due to their relatively limited ability to flee or fight. The hook may include a bent shank 28 with a ortion of the shank extending from the eye 30 through the head 512, and another shank portion exposed behind or below the head, with the bight 32 curving around the forwardmost portion or nose of the head 512. This hook configuration may be incorporated with other lure embodiments, as desired.

Figure 13:
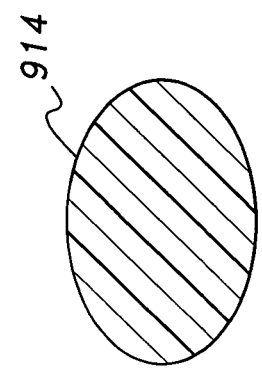
FIG. 13 is a section view of a fourth body section of a fishing lure according to the present invention, the body having a flattened oval cross section.
Figure 12:
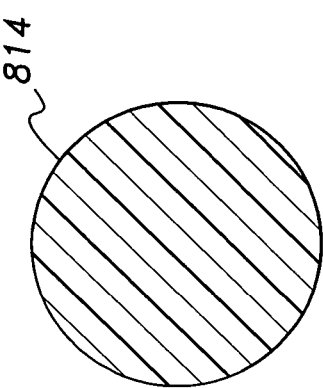
FIG. 12 is a section view of another alternative body section of a fishing lure according to the present invention, the body having a circular cross section.
Figure 11:
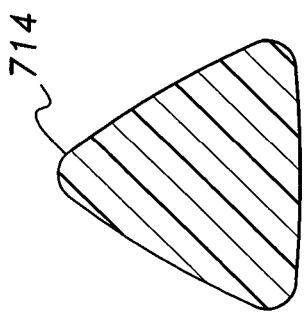
FIG. 11 is a section view of an alternative body section of a fishing lure according to the present invention, the body having a generally triangular cross section.
Figure 10:
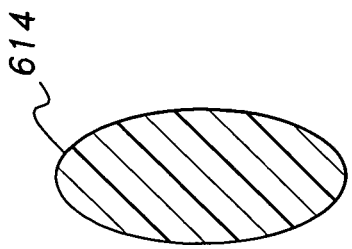
FIG. 10 is a section view of an exemplary body section of a fishing lure according to the present invention, the body having an oval cross section.

FIGS. 10 through 13 are cross-sectional views of various body shapes or configurations that might be incorporated with the lure. FIG. 10 illustrates an oval body cross section 614 with its major axis oriented vertically. FIG. 11 shows a body cross section 714 having a generally triangular configuration. FIG. 12 is a substantially circular cross section body configuration 814, while FIG. 13 shows another oval body configuration 914 similar to the configuration 614 of FIG. 10, but having its major axis oriented laterally to provide a thinner and more flexible body in the vertical plane. It will be seen that any of the body shapes or configurations of FIGS. 10 through 13 may be incorporated with any of the lure configurations of FIGS. 1 through 9 as desired, and that the cross sectional shapes shown in FIGS. 10 through 13 are exemplary and that many other cross sectional shapes may be incorporated with the lure as desired.

It is to be understood that the present invention is not limited to the embodiments described above, but encompasses any and all embodiments within the scope of the following claims.

I claim:

1. A fishing lure, comprising:

an elongated head portion having a forward end and a rearward end which define a longitudinal axis of the head portion therebetween, an upper surface and a lower surface;

an elongated body portion having an upper surface and a lower surface, each of the upper and lower surfaces of the body portion having a plurality of longitudinally staggered, laterally oriented upper and lower body flexure grooves disposed therealong, wherein each of the staggered grooves constitute the sole groove at the respective location on the body portion along a longitudinal axis of the body portion thereby permitting the body portion to readily flex and undulate in the vertical plane;

a laterally narrow neck portion flexibly connecting the rearward end of the head portion and the body portion to one another, the body portion extending rearwardly from the neck portion, wherein the head portion and the body portion define laterally opposed, vertically oriented first and second grooves therebetween on each side of the neck portion thereby permitting the head and body portions to possess sufficient lateral and torsional flexibility to simulate realistic movement, a forwardmost one of the lower body flexure grooves being disposed across the neck portion thereby permitting the head and body portions to readily flex and undulate in a vertical plane; and a hook having an eye, a shank extending from the eye, a tip, and a curved bight disposed between the shank and the tip, the shank both being disposed within the head portion and extending parallel to the longitudinal axis of the head portion, the eye extending from the upper surface of the head portion transverse to the longitudinal axis of the head portion, and the bight extending outwardly of the head portion and forwardly of the eye and forward end of the head portion.

2. The fishing lure according to claim 1, wherein the tip of the hook is in contact with the head portion, thereby defining a closed bight for reducing entry of foreign matter therein.

3. The fishing lure according to claim 1, wherein the head portion is formed of a harder material than the body portion.

4. The fishing lure according to claim 1, wherein the head portion, the body portion, and the neck portion are formed in one piece of plastisol.

5. The fishing lure according to claim 1, wherein the body portion, the head portion, and the neck portion are formed of material having a density less than that of water.

6. The fishing lure according to claim 1, wherein the body portion includes at least one other narrow neck portion defined by other laterally opposed, vertically oriented grooves.

* * * * *